United States Patent [19]
Baker

[11] 4,454,687
[45] Jun. 19, 1984

[54] GUIDE AND SUPPORT ASSEMBLY FOR A WINDOW PANE

[75] Inventor: Joe L. Baker, Carman, Ill.

[73] Assignee: J. I. Case Company, Racine, Wis.

[21] Appl. No.: 435,408

[22] Filed: Oct. 20, 1982

[51] Int. Cl.³ .............................................. E05D 13/00
[52] U.S. Cl. ........................................ 49/419; 49/428
[58] Field of Search ................ 49/419, 414, 421, 428, 49/431, 432, 433, 434, 435, 440, 441

[56] References Cited

U.S. PATENT DOCUMENTS

| | | | |
|---|---|---|---|
| 528,733 | 11/1894 | McKenzie . | |
| 1,696,588 | 12/1928 | Bailey . | |
| 1,760,227 | 5/1930 | Appleby | 49/428 |
| 1,808,699 | 6/1931 | Watkins . | |
| 2,157,426 | 5/1939 | Nelson . | |
| 2,449,361 | 9/1948 | Axe . | |
| 2,560,139 | 7/1951 | Taxin . | |
| 2,563,058 | 8/1951 | Neustadt | 49/441 X |
| 2,664,599 | 1/1954 | Zitomer . | |
| 2,796,960 | 6/1957 | Reynolds | 49/419 X |
| 3,162,905 | 12/1964 | Erickson . | |
| 3,286,389 | 11/1966 | Draplin et al. | 49/441 |
| 4,034,510 | 7/1977 | Huelskopf | 49/419 |

*Primary Examiner*—Philip C. Kannan
*Attorney, Agent, or Firm*—Dressler, Goldsmith, Shore, Sutker & Milnamow, Ltd.

[57] ABSTRACT

An arrangement for guiding and supporting a windowpane is disclosed which is particularly suited for embodiment in association with the windowpanes of a tractor cab. The arrangement includes a unitary guide member with integral biasing means adapted to receive the marginal edge portion of a windowpane. The unitary guide is adapted for operative engagement with a support channel or track for slidable movement of the windowpane and guide together within the track. Retention means are provided to prevent undesired disengagement of the unitary guide from the support track. The track and unitary guide are preferably extruded elements which are formed from resilient material to effect the desired biased engagement of the guide with the track, and to accommodate fabrication and assembly of the arrangement.

6 Claims, 4 Drawing Figures

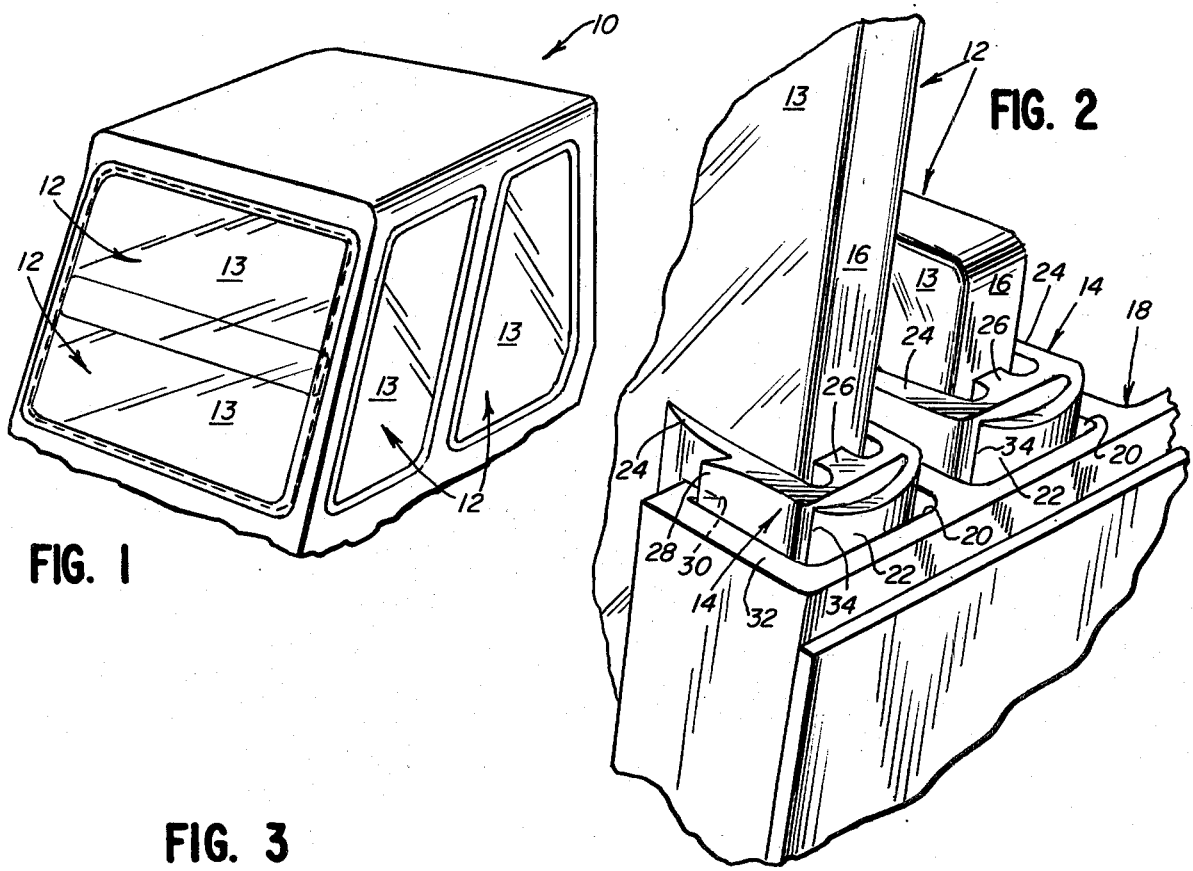
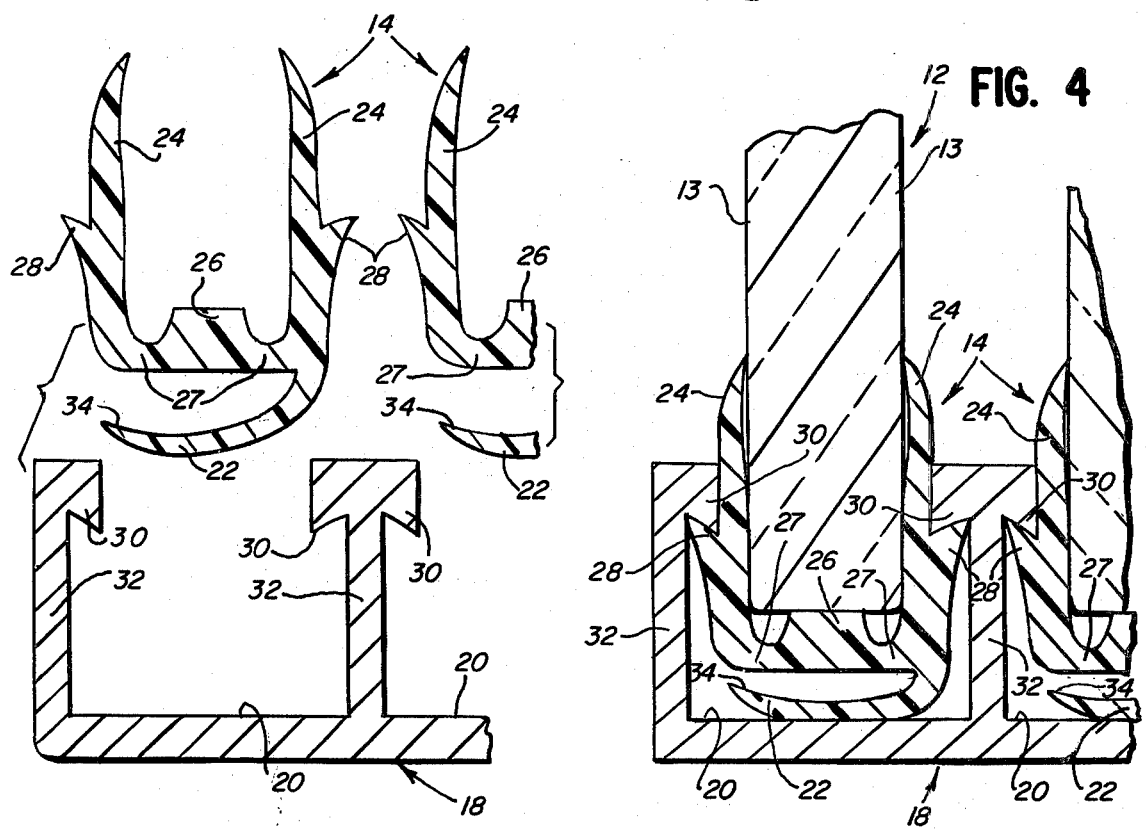

GUIDE AND SUPPORT ASSEMBLY FOR A WINDOW PANE

FIELD OF THE INVENTION

This invention relates generally to window assemblies, and more particularly to an improved assembly for guiding and supporting a movable windowpane.

BACKGROUND OF THE INVENTION

Window guide and support assemblies are used in a variety of window installations for allowing guidance and support of a windowpane for movement along a predetermined path. Assemblies of this type generally include a guide adapted to receive a windowpane, and may include some type of biasing means for positioning the guide with respect to a track within which the windowpane and guide assembly are movable. This type of assembly provides guidance and support of the windowpane to facilitate movement of the windowpane along the predetermined length of the track.

While the above-described guide and support assemblies facilitate the guidance and support during movement of a windowpane, several disadvantages exist which detract from their convenient installation and use.

Most previously known assemblies include a biasing element that is distinct and separate from the guide and track. This type of construction typically adds to assembly labor costs, and can complicate initial assembly or later repair because of the number of separate components which must be supplied. These increased costs are compounded when the specific window installation requires multiple windowpanes.

Most previously known arrangements have included a guide that was not readily adjustable for window panes of varying widths. The few devices that have been proposed for allowing adjustability of the guide for varying pane widths have the disadvantage of compromising secure support of the windowpane while mounted within the guide means for movement along the track.

Another disadvantage of most previously known assemblies is the fact that the construction of such assemblies frequently allows accumulation of debris and unwanted material within the track. The accumulation of debris and unwanted material hinders convenient operation of the guide and support assembly, and mandates periodic maintenance to assure continued ease of use.

Until the present invention, the various disadvantages associated with the above-discussed types of guide and support assemblies for windowpanes tended to make installation and use of such devices less convenient than desired, and have resulted in resort to relatively complicated arrangements.

It would therefore be beneficial to provide an improved guide and support assembly for a windowpane that could be easily manufactured and would include a unitary guide incorporating an integral biasing means. Elimination of a multi-piece guide structure facilitates fabrication of the window installation by considerably reducing the time necessary to construct the assembly. Further cost reduction can be realized if the assembly conponents can be readily manufactured by extrusion. Such cost reduction is greatly increased when the installation of such guide and support assemblies is employed for support of multiple windowpanes.

It is also desirable with such an improved guide and support assembly to provide means for adjusting the guide to accommodate windowpanes of various widths, while also providing the support necessary to secure the windowpane to the guide means for the required movement of the guide and pane within the track. It is also advantageous to seal off the track opening to facilitate elimination of accumulation of debris and unwanted material, while not hindering the required movement of the guide and pane within the track.

SUMMARY OF THE INVENTION

The guide and support assembly embodying the present invention, among other things, substantially eliminates the disadvantages of previous arrangements by providing a guide and support assembly that includes a unitary guide with integral biasing means that can be retained within a track. This type of guide allows for lower manufacturing and assembly costs due to elimination of a separate biasing means, provides desired self-adjustment for varying glass widths, and provides increased sealing of the track channel to reduce debris accumulation and attendant maintenance expenses.

In the illustrated embodiment of the present invention, a novel guide and support assembly is provided for use with a windowpane. The guide and support assembly includes a unitary guide with an integral biasing means. The guide is adapted to receive windowpanes of various widths, and is adapted to minimize movement of the windowpane with respect thereto.

The guide and support assembly also includes a track adapted for interengagement with and support of the guide. The guide and the track are both adapted to allow smooth and convenient positional movement of the guide with respect to the track while the integral biasing means of the guide is operatively engaged with the track to "spring-load" the guide to control the sliding movement of the guide and the windowpane together.

In the illustrated embodiment, the guide and support assembly includes retaining means for preventing unintended disengagement of the guide from the track. The retaining means include at least one projection extending from the guide and a retaining lip on the track adapted to engage and cooperate with the projection extending from the guide.

This assembly permits windowpanes of varying widths to be received and supported by the guide, and allows the guide and windowpane together to be received and supported by the track for movement of the guide and the windowpane with respect to the track. In addition, the guide and window together are retained within the track while the track is effectively sealed, thereby minimizing unwanted accumulation of debris and other foreign matter. This retention also prevents the guide and window from being unintentionally removed from the track, while enhancing the appearance and wear characteristics of the assembly.

Upon placement of the guide and window together within the track, the integral biasing means associated with the guide effectively allows selective positioning of the windowpane and guide with respect to the track, and obviates problems of cocking or jamming of the windowpane. This selective positioning is provided by the resilient nature of the integral biasing means, the biasing means being adapted to operatively engage the window track when the guide and windowpane are positioned therein.

Numerous other advantages and features of the present invention will become readily apparent from the following detailed description of the invention and embodiment thereof, from the claims, and from the accompanying drawings in which like numerals are employed to designate like parts throughout the same.

BRIEF DESCRIPTION OF THE DRAWINGS

FIG. 1 is a full perspective view of a tractor cab embodying the present guide and support assembly for a windowpane;

FIG. 2 is an enlarged, fragmentary perspective view in partial cut-away illustrating the present guide and support assembly for a windowpane;

FIG. 3 is an enlarged cross-sectional view illustrating the guide and the track of the present invention; and FIG. 4 is an enlarged perspective view illustrating the guide positioned within the track and being retained therein.

DESCRIPTION OF THE PREFERRED EMBODIMENT

While this invention is susceptible of embodiment in many different forms, there is shown in the drawings and will herein be described in detail a presently preferred embodiment, with the understanding that the present disclosure is to be considered as an exemplification of the principles of the invention and is not intended to limit the invention to the embodiment illustrated. The illustrated embodiment is included to aid in the understanding of the invention, and variations may be made by one skilled in the art without departing from the spirit and scope of the invention.

Upon inspection of FIG. 1, it will be seen that a tractor cab assembly 10 with associated windowpanes 12 is therein illustrated. A plurality of window panes 12 include expansive surfaces 13 which provide areas of support as well as areas for vision therethrough. While the present invention as described herein is shown in conjunction with windowpanes 12 of tractor cab 10, it will be understood by those skilled in the art that the guide and support assembly of the present invention is equally suitable for use in other windowpane installations.

The present preferred of the present invention is illustrated in FIG 2, and comprises at least one unitary guide 14 which is adapted to receive a marginal edge 16 of windowpane 12, and a flange guide support or track 18. The guide 14 and the track 18 may be formed from suitable plastic material, with track 18 adapted to receive unitary guide 14 for smooth and guided movement within the track 18. It will be appreciated that the embodiment in FIG. 2 illustrates dual windowpanes 12 and therefore illustrates dual guide and support assemblies of the present invention. As illustrated, the track 18 is formed with two channels 20, each adapted to receive a unitary guide 14 and associated windowpane 12.

It will be appreciated that the guide and support assembly of the present invention is of an elongated configuration to accommodate the necessary engagement with the windowpane 12 for support thereof, and to provide the desired slidable movement of the window pane 12 and unitary guide 14, together, within track 18. To provide this elongated construction, while keeping with the desired objects of the invention, the unitary guide 14 and track 18 can be readily formed using an extrusion process. This type of formation process in part provides the desired low cost and ease of manufacturing that the present invention provides.

As will be further described, the unitary guide 14 includes an integral biasing leg 22 for operative engagement with the track 18 to control sliding movement of the unitary guide 14 and the windowpane 12 together with respect to the track 18. Further, the unitary guide 14 includes guide fingers 24 which are joined at a web base or shoulder portion 26 by connecting portions 27. Connecting portions 27 are of a relatively reduced cross-section to accommodate enhanced biased engagement of the unitary guide 14 with the window pane 12 in a clamp-like fashion.

The guide fingers 24, web base 26 and connection portions 27 together form a window pane-engaging portion of unitary guide 14 which is generally C-shaped or U-shaped. Guide fingers 24 are adapted to engage the respective expansive surfaces 13 of the windowpane 12, while the marginal edge 16 of windowpane 12 is adapted to abut and engage web base 26. The guide fingers 24 are preferably formed in spaced relation a distance less than the thickness of the window pane 12 to facilitate biased engagement of the guide fingers 24 with the expansive surfaces 13 of pane 12. This engagement allows the guide fingers 24 to support windowpane 12 while providing frictional resistance against movement of the windowpane 12 within the unitary guide 14.

FIGS. 3 and 4 illustrate the unitary guide 14 and track 18 in disengaged and engaged positions, respectively. To facilitate positioning in the engaged position, cooperative retention means are provided both on the unitary guide 14 and the track 18 for preventing unintended disengagement of the unitary guide 14 from the track 18. The desired retention is preferably provided by an integral retaining tab 28 projecting from each of guide fingers 24. When unitary guide 14 is placed into engagement with track 18, as illustrated in FIG. 4, the retaining tabs 28 are positioned under retaining lips 30 preferably formed integrally with track 18, and projecting inwardly of channel 29 from upright arms 32 which define the channel 20. Each upright arm 32 preferably includes at least one of the retaining lips 30 depending therefrom for respective cooperative engagement of the lips 30 with the retaining tabs 28 of guide 14. This construction allows the unitary guide 14 to remain in engagement with track 18 when positioned within channel 20. In addition, this construction effectively seals channel 20 from unwanted debris and foreign matter that may hinder the sliding movement of unitary guide 14 within channel 20 of track 18.

Returning to FIG. 3, it will be appreciated that in a double windowpane installation such as illustrated, one of the upright arms 32, i.e., the centrally disposed upright arm, preferably includes two retaining lips 30 each respectively depending into one of the two channels 20. This construction allows retention of two unitary guides 14, thus allowing two windowpanes 12 to be independently selectively slidable within channels 20 of track 18.

Referring to FIGS. 3 and 4, it will be seen that the unitary guide 14 of the presently preferred embodiment of the invention is preferably generally Y-shaped in cross-section, with biasing leg 22 depending from the generally U-shaped window engaging portion which comprises guide fingers 24, web base 26, and connecting portions 27. Further, it can be seen that the integral biasing leg 22 of unitary guide 14 extends generally away from the web base 26, and the marginal edge portion of windowpane 12 received within the guide 14. The biasing leg 22 preferably extends integrally from one of the leg portions 24, terminating at a free edge 34 such that at least a portion of biasing leg 22 is spaced from the U-shaped pane-engaging portion of the guide 14. The integral biasing leg 22 is preferably generally arcuate in cross-sections, and is adapted to resiliently bias the unitary guide 14 with respect to the track 18. This preferred construction facilitates the retention of guide 14 within track 18 by cooperation of tabs 28 and lips 30, while permitting selective positioning of the windowpane 12 and guide 14 within the track 18. Further, this preferred integral biasing arrangement permits the guide 14 to "float" or readily adjust to windowpanes of varying widths.

Thus, the present invention provides an improved guide and support assembly for a windowpane which facilitates selective positioning of the windowpane, minimizes the accumulation of debris and unwanted material within the assembly, utilizes extruded track and unitary guide elements for low cost multiplexing of several windows, and facilitates assembly of the finished window installation.

While the present invention has been illustrated for use with windowpanes of a tractor cab, it will be recognized that the novel arrangement can be readily adapted to provide the necessary guide and support in a variety of different window installations. In this manner, the present guide and support assembly can be adapted to operate in both the vertical and horizontal linear sliding modes.

From the foregoing, it will be appreciated that numerous variations and modifications may be effected without departing from the true spirit and scope of the novel concept of the present invention. It will be understood that no limitation with respect to the specific apparatus illustrated herein is intended or should be inferred. It is, however, intended to cover by the appended claims all such modifications as fall within the scope of the claims.

What is claimed is:

1. An arrangement for movably supporting a windowpane having expansive surfaces comprising:
    track means with respect to which said windowpane is generally movable; and
    unitary guide means adapted to receive a marginal edge portion of said windowpane and comprising a pane-engaging portion which is generally U-shaped, including a web base portion adapted to engage the marginal edge portion of said windowpane, and a pair of finger portions adapted to respectively engage the expansive surfaces of said windowpane, and further comprising at least on portion of reduced cross section joining at least one of said finger portions to said web base portion to accommodate resilient engagement of said guide means and said windowpane, said guide means being adapted for interengagement with said track means for relative movement with respect thereto, said arrangement including retention means for retaining said guide means within said track means;
    said guide means including integral biasing means adapted for operative engagement with said track means to control sliding movement of said guide means and said windowpane together with respect to the support means, and
    comprising a portion extending generally away from said marginal edge of said windowpane and including at least a portion adapted to be spaced from said U-shaped portion of said guide means that is generally arcuate in cross section and adapted to resiliently bias said guide means with respect to said track means for facilitating selective positioning of said windowpane with respect to said track means.

2. The windowpane supporting arrangement of claim 1, including
    retention means for preventing disengagement of said guide means from said track means.

3. A window guide assembly for support of a windowpane having expansive surfaces comprising:
    elongated channel means generally defining a path for movement of said windowpane; and
    elongated unitary guide means adapted to receive a marginal edge portion of said windowpane. Said guide means is generally Y-shaped in cross section and includes a shoulder portion adapted to engage the marginal edge portion of said windowpane, and a pair of finger portions adapted to respectively engage the expansive surfaces of said windowpane, said guide means being adapted for operative interengagement with said channel means for slidable movement with respect thereto;
    said guide assembly including retention means comprising at least one tab portion projecting from said guide means, and at least one tab-retaining lip on said channel means adapted to engage and operatively cooperate with said tab portion;
    said guide means including resilient biasing means integral therewith adapted for operative engagement with said channel means to facilitate selective positioning of said windowpane with respect to said channel means,
    which resilient biasing means comprises a biasing portion extending generally away from said marginal edge of said windowpane integrally from one of said finger portions and having a generally arcuate cross section and a free edge portion.

4. The supporting windowpane guide assembly of claim 3, wherein
    said guide means further comprise portions of relatively reduced cross-section respectively joining said finger portions to said shoulder portion to accommodate biased engagement of said guide means with said windowpane.

5. The supporting windowpane guide assembly of claim 3, wherein
    said finger portions are spaced apart a distance less than the thickness of said windowpane to facilitate biased engagement of said finger portions with said expansive surfaces of said windowpane.

6. The supporting windowpane guide assembly of claim 3, wherein
    said retention means comprises a tab portion projecting from each of said finger portions of said guide means, and a pair of tab-retaining lips on said channel means adapted to respectively engage and cooperate with said tab portions for retaining said guide means within said channel means.

* * * * *